(12) United States Patent
Wolcott et al.

(10) Patent No.: US 10,187,397 B2
(45) Date of Patent: *Jan. 22, 2019

(54) MODULATION ANALYSIS AND DISTORTION IDENTIFICATION

(71) Applicant: Comcast Cable Communications, LLC, Philadelphia, PA (US)

(72) Inventors: Lawrence D. Wolcott, Denver, CO (US); Phillip F. Chang, Langhorne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,173

(22) Filed: Feb. 7, 2017

(65) Prior Publication Data

US 2018/0198798 A1 Jul. 12, 2018

Related U.S. Application Data

(63) Continuation of application No. 14/187,912, filed on Feb. 24, 2014, now Pat. No. 9,602,518, which is a
(Continued)

(51) Int. Cl.
*H04L 29/06* (2006.01)
*H04L 25/03* (2006.01)
(Continued)

(52) U.S. Cl.
CPC ............ *H04L 63/107* (2013.01); *H04L 25/03* (2013.01); *H04L 25/03019* (2013.01);
(Continued)

(58) Field of Classification Search
CPC ... H04L 2025/0342; H04L 2025/03808; H04L 1/206; H04L 25/03019; H04B 2201/709709

See application file for complete search history.

(56) References Cited

U.S. PATENT DOCUMENTS 5,311,546 A  5/1994 Paik et al.
5,881,108 A  3/1999 Herzberg et al.
(Continued)

FOREIGN PATENT DOCUMENTS

JP  04208707 B2  1/2009

OTHER PUBLICATIONS

US 5,434,193, 08/2002, Fukuoka (withdrawn)
(Continued)

*Primary Examiner* — Khanh C Tran
(74) *Attorney, Agent, or Firm* — Banner & Witcoff, Ltd.

(57) ABSTRACT

An apparatus, method, computer readable medium, and system are provided to determine whether a non-linear signal impairment is present in a network communication channel. For instance, a computing device may transmit equalization coefficients to a user device to modify future signals generated by the user device. If the equalization coefficients are unable to reduce a signal impairment, the signal impairment may be a non-linear signal impairment. The computing device may generate symbol placements based on signals received from the user device and transmit status messages.

24 Claims, 10 Drawing Sheets

Related U.S. Application Data continuation of application No. 12/848,262, filed on Aug. 2, 2010, now Pat. No. 8,693,530.

(60) Provisional application No. 61/301,835, filed on Feb. 5, 2010.

(51) Int. Cl.
*H04L 12/26* (2006.01)
*H04L 29/08* (2006.01)
*H04L 25/02* (2006.01)

(52) U.S. Cl.
CPC .......... *H04L 43/0823* (2013.01); *H04L 67/18* (2013.01); *H04L 25/022* (2013.01); *H04L 2025/0342* (2013.01); *H04L 2025/03808* (2013.01)

(56) References Cited

U.S. PATENT DOCUMENTS

| | | | |
|---|---|---|---|
| 6,377,810 B1 | 4/2002 | Geiger et al. | |
| 6,556,239 B1 | 4/2003 | Al-Araji et al. | |
| 6,671,334 B1 | 12/2003 | Kuntz et al. | |
| 6,728,887 B1 | 4/2004 | Dziekan et al. | |
| 6,862,315 B1* | 3/2005 | Garg | H04L 25/03133 375/232 |
| 6,880,170 B1 | 4/2005 | Kauffman et al. | |
| 6,947,502 B2 | 9/2005 | Taylor et al. | |
| 6,947,741 B2 | 9/2005 | Beech et al. | |
| 7,142,609 B2* | 11/2006 | Terreault | H04L 1/206 375/261 |
| 7,574,492 B2 | 8/2009 | Karaoguz et al. | |
| 7,742,777 B2 | 6/2010 | Strater et al. | |
| 7,843,847 B2 | 11/2010 | Quigley et al. | |
| 8,143,900 B2 | 3/2012 | Shimp et al. | |
| 8,284,828 B2* | 10/2012 | Cooper | H04L 25/03006 375/231 |
| 8,416,697 B2 | 4/2013 | Wolcott et al. | |
| 8,458,759 B2 | 6/2013 | Zinevich | |
| 8,576,705 B2 | 11/2013 | Thibeault et al. | |
| 8,650,602 B2 | 2/2014 | Pond et al. | |
| 8,787,223 B2 | 7/2014 | Watson et al. | |
| 8,829,916 B2 | 9/2014 | Defoort et al. | |
| 2001/0017904 A1 | 8/2001 | Pukkila et al. | |
| 2003/0058786 A1 | 3/2003 | Sato et al. | |
| 2003/0109999 A1* | 6/2003 | Stein | G01D 18/008 702/86 |
| 2003/0191856 A1 | 10/2003 | Lewis et al. | |
| 2003/0217122 A1 | 11/2003 | Roese et al. | |
| 2004/0100881 A1 | 5/2004 | Wakabayashi et al. | |
| 2004/0145470 A1 | 7/2004 | Fager et al. | |
| 2004/0153898 A1 | 8/2004 | Hidaka | |
| 2004/0222908 A1 | 11/2004 | MacDonald et al. | |
| 2005/0207346 A1 | 9/2005 | Chu et al. | |
| 2005/0226421 A1 | 10/2005 | Briancon et al. | |
| 2006/0007997 A1 | 1/2006 | Jones | |
| 2006/0121946 A1 | 6/2006 | Walton et al. | |
| 2006/0135907 A1 | 6/2006 | Remde et al. | |
| 2006/0142976 A1 | 6/2006 | Bonanni et al. | |
| 2006/0271986 A1 | 11/2006 | Vogel | |
| 2007/0109995 A1 | 5/2007 | Quigley et al. | |
| 2007/0211618 A1 | 9/2007 | Cooper et al. | |
| 2007/0288982 A1 | 12/2007 | Donahue | |
| 2008/0080607 A1* | 4/2008 | Shah | H04L 25/03019 375/232 |
| 2008/0089224 A1 | 4/2008 | Kim et al. | |
| 2008/0129421 A1 | 6/2008 | Ninan et al. | |
| 2008/0192816 A1 | 8/2008 | Momtaz | |
| 2008/0276111 A1 | 11/2008 | Jacoby et al. | |
| 2009/0007210 A1 | 1/2009 | Nishide et al. | |
| 2009/0268799 A1 | 10/2009 | Wang et al. | |
| 2009/0304065 A1 | 12/2009 | Choi et al. | |
| 2010/0095360 A1 | 4/2010 | Pavlovski et al. | |
| 2010/0142608 A1 | 6/2010 | Kim et al. | |
| 2010/0158093 A1 | 6/2010 | Thompson et al. | |
| 2010/0183258 A1 | 7/2010 | Chow et al. | |
| 2010/0185865 A1 | 7/2010 | Yeap et al. | |
| 2010/0223650 A1 | 9/2010 | Millet et al. | |
| 2011/0026577 A1 | 2/2011 | Primo et al. | |
| 2011/0110415 A1 | 5/2011 | Cooper et al. | |
| 2015/0318937 A1 | 11/2015 | Ruth et al. | |

OTHER PUBLICATIONS

"VSWR, or Voltage Standing Wave Ratio", available at http://emc.loprudder.com/vswr.pdf (last visited Nov. 22, 2010).

Melissa Ray Weimer, "Waveform Analysis Using the Fourier Transform", DATAQ Instruments, Inc., available at http:!/www.dataq.com/applicat/articles/an11.htm (last visited Nov. 22, 2010).

Rob Thompson, et al., "Optimizing Upstream Throughput Using Equalization Coefficient Analysis", National Cable & Telecommunications Association (NCTA) Technical Papers, Apr. 2009.

Robert L. Howald et al., "Characterizing and Aligning the HFC Return Path for Successful DOCSIS 3.0 Rollouts", SCTE Cable-Tee Expo, Denver, CO, Oct. 28-30, 2009.

Robert L. Howald et al., "Docsis 3.0 Upstream: Readiness & Qualification," SCTE Cable-Tec Expo, Oct. 2009.

DOCSIS® Best Practices and Guidelines Proactive Network Maintenance Using Pre-equalization CM-GL-PNMP-V01-100415;Apr. 15, 2010.

CableLabs invention disclosure titled "Pre-Equalization based proactive network maintenance process model"; prior to Nov. 1, 2010.

Hranac, R., "Linear Distortions part 1 ,"downloaded Apr. 22, 2010.

Qureshi, S.U.H., "Adaptive Equalization," Proceedings of the IEEE, Sep. 1985.

CableLabs invention disclosure titled "A Simple algorithm for fault localization using naming convention and micro-reflection signature"; prior to Nov. 1, 2010.

* cited by examiner

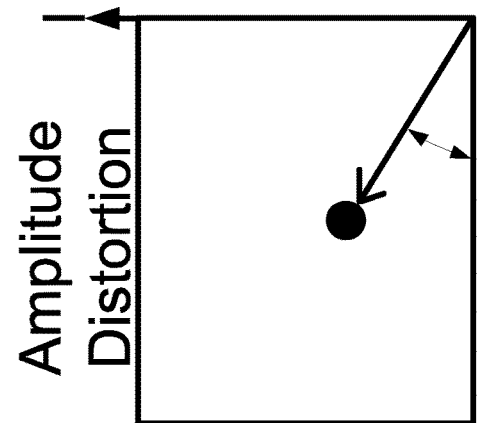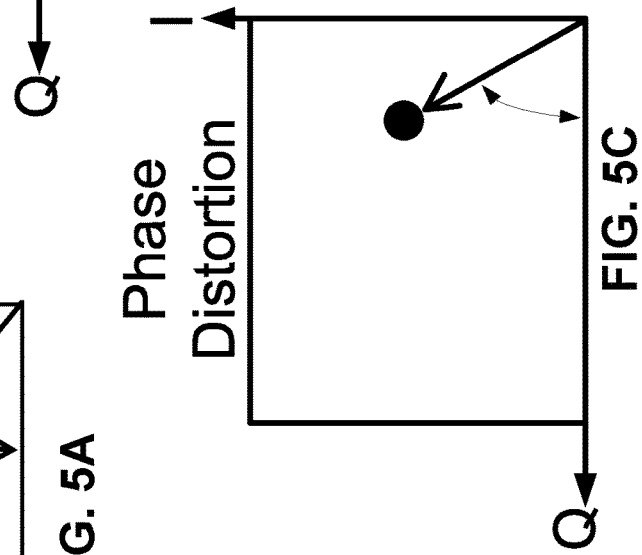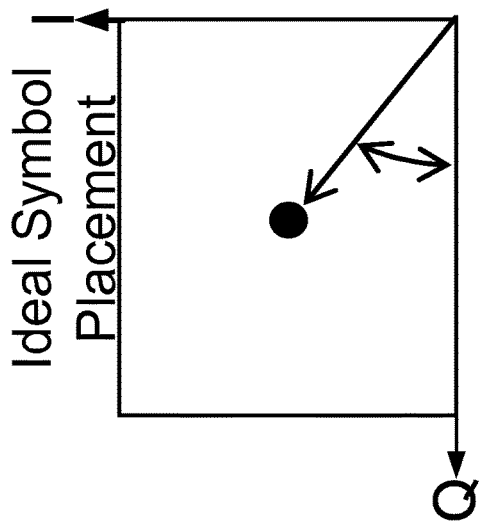

MODULATION ANALYSIS AND DISTORTION IDENTIFICATION

RELATED APPLICATIONS

The present application is a continuation of U.S. application Ser. No. 14/187,912, filed Feb. 24, 2014, and entitled "Modulation Analysis and Distortion Identification", which is a continuation of U.S. application Ser. No. 12/848,262, filed Aug. 2, 2010 (now U.S. Pat. No. 8,693,530, issued Apr. 8, 2014), and entitled "Modulation Analysis and Distortion Identification", which is related to and claims the priority benefit of U.S. Provisional Patent Application No. 61/301,835, filed Feb. 5, 2010, and entitled "Modem Signal Usage and Fault Isolation", each of which is incorporated by reference herein its entirety and made part hereof.

FIELD OF ART

The features described herein generally relate to providing users with access to content over a network. More specifically, aspects of the disclosure describe identifying the likely or approximate location of a potential problem or error associated with a network.

BACKGROUND

Service providers and network operators strive to provide quality service to users. In the context of networks, signal degradation may pose significant challenges in providing quality service. For example, interference in return path RF frequencies is the most common cause of upstream transmission failure. Connection-oriented protocols, such as TCP, will typically retransmit lost packets. However, real-time streaming protocols used in voice and video do not. The loss of upstream packets results in poor quality voice and video experience from a user perspective. QAM analysis provides a meaningful capability to identify and resolve return path signal impairments.

Packages composed of hardware and software are available to characterize an upstream communication channel. However, such packages are expensive to purchase, license and maintain, require specialized skills to install, operate and maintain, are band-limited to a finite number of connections and require rack space and power, and typically result in user down-time when hardware is installed or sweeps are in progress. Improved and advanced techniques are needed in order to accurately, efficiently, and quickly characterize upstream communication channels.

SUMMARY

This summary is not intended to identify critical or essential features of the disclosure provided herein, but instead merely summarizes certain features and variations thereof.

In some embodiments, pre-equalization coefficients may be used in conjunction with Fourier analysis to derive an inverse channel response of a return path spectrum. Amplitude-to-frequency and phase-to-frequency distortion characteristics may be used to synthesize an iteration of quadrature amplitude modulation (QAM) symbols. The QAM symbols may demonstrate radial tilt and voltage dispersion caused by underlying distortion sources in transmission.

The equalization coefficients may be indicative of samples of a signal taken at discrete periods of time. Each sample may coincide with a tap of a tap-delay filter. For example, the main-tap may coincide with a signal from a user terminal at a discrete instant in time and the other taps may represent prior or future samples of the signal relative to the main-tap. In some embodiments, one or more processors associated with one or more devices may execute instructions stored in a memory to implement the tap-delay filter, to establish equalization coefficients, and to analyze the equalization coefficients.

In some embodiments, a symbol placement associated with a transmission scheme may be generated or synthesized by transforming the equalization coefficients. Symbols included in the symbol placement may be analyzed and quantified in terms of their distance from a (demodulation) decision boundary. Symbols may be generated on an iterative basis in order to obtain visibility into the underlying performance of the transmission scheme over time. In some embodiments, if equalization is unable to reduce a signal impairment below a threshold value, then a determination may be made that a non-linear distortion source is present in a network or communication system. Signals received from a plurality of user terminals may be compared with one another in order to determine a probable location or cause of the non-linear distortion.

Other details and features will also be described in the sections that follow.

BRIEF DESCRIPTION OF THE DRAWINGS

Features of this disclosure will become more apparent upon a review of the disclosure in its entirety, including the drawing figures provided herewith, the contents of which are fully incorporated herein by way of reference.

Some features herein are illustrated by way of example, and not by way of limitation, in the figures of the accompanying drawings and in which like reference numerals refer to similar elements.

FIGS. 5A-5C illustrate a closer view of a portion of a constellation diagram in connection with one or more aspects of this disclosure.

DETAILED DESCRIPTION

It is noted that various connections between elements are discussed in the following description. It is noted that these connections are general and, unless specified otherwise, may be wired or wireless, direct or indirect, and that this specification is not intended to be limiting in this respect.

Figure 1:
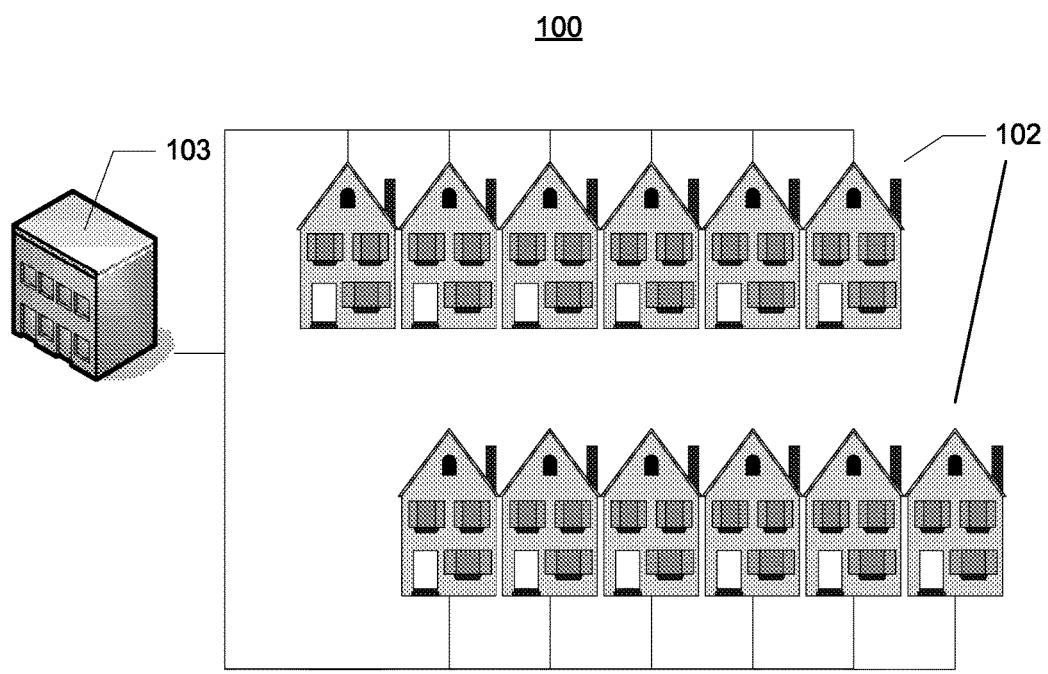
FIG. 1 illustrates an example information distribution system.

FIG. 1 illustrates an example information distribution network 100 on which many of the various features described herein may be implemented. Network 100 may be any type of information or content distribution network, such as satellite, optical fiber, coaxial cable, telephone, cellular, wireless, etc. The network may be a hybrid fiber/coax distribution network found in many television networks. Such networks 100 may use a series of interconnected communication lines 101 to connect multiple homes 102 to a provider's facility, headend, or central location 103. The central location 103 may transmit downstream information signals onto the lines 101, and each home 102 may have a tuner used to receive and process those signals. Signals may also include upstream transmissions from homes 102 to central location 103.

The lines 101 may be a series of interconnected lines of different type, such as optical fiber and/or coaxial cables, or wireless links. There may be one line originating from the central location 103, and it may be split a number of times to distribute the signal to various remote sites such as homes 102 in the vicinity (which may be many miles) of the central location 103. The lines 101 may include components not illustrated, such as splitters, filters, amplifiers, etc. to help convey the signal clearly. Portions of the lines 101 may also be implemented with fiber-optic cable, resulting in a hybrid fiber/cable (HFC) network of lines 101. By running fiber optic cable along those portions, signal degradation in those portions may be significantly minimized, allowing a single central location 103 to reach even farther with its network of lines 101 than before. Portions of lines 101 may also be implemented via wireless links.

Figure 2:
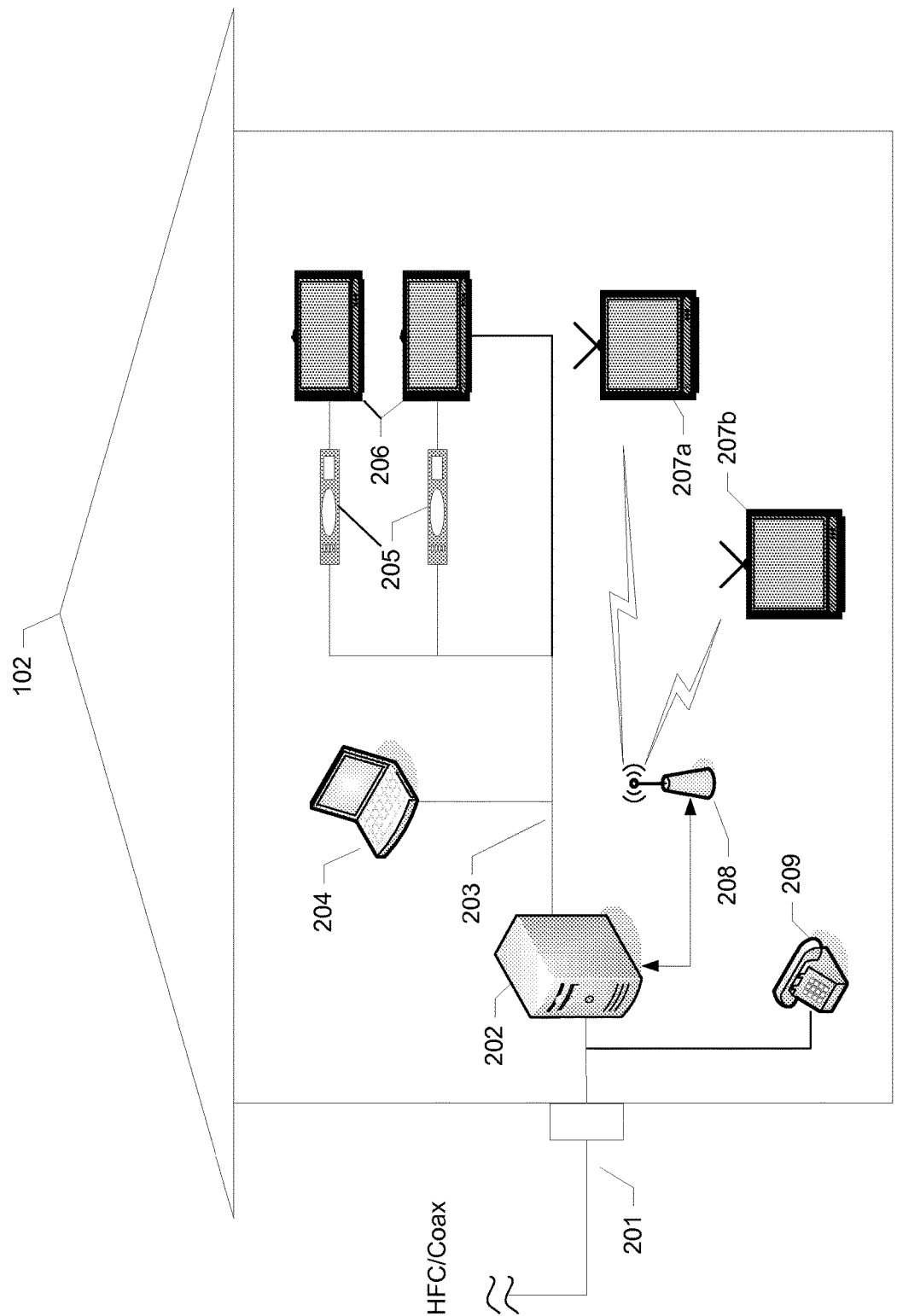
FIG. 2 illustrates an example architecture, with a closer level of detail on one of the premises illustrated in the FIG. 1 network.

FIG. 2 illustrates a closer view of one of the remote sites, home 102 from FIG. 1. As illustrated, the home may be connected to the network 100 by, for example, wireless optical fiber or coaxial cable feed 201. The feed may be connected to a gateway device 202, which may serve as an interface between the devices within the home 102, and the external devices out on the network 100. The gateway itself may include tuners, modulators, demodulators, etc. to communicate out on the network 100, and may also include interface components to communicate with the devices in the home.

As for the network in the home, the specific types of components may vary, depending on the type of communication network used in the home. One example may be an Internet Protocol network 203 carried over the home's internal coaxial wiring under the MoCA (Multimedia Over Coax Alliance) standard. To this end, the gateway 202 may be an IP transport gateway, using IP communications to communicate with the devices in the home, and with devices outside the home (e.g., via a DOCSIS CMTS in a HFC-type network, for example). Other networks, such as fiber optic or wireless networks, may alternatively be used.

Various devices may communicate on the network in the home. For example, one or more personal computers 204 may use the gateway 202 to communicate with other devices on the Internet. Customer premises equipment (CPE) 205, such as televisions or set-top boxes (STBs), may receive IP distribution of video content received at the gateway 202, and convert that video content into a format suitable for display on corresponding display devices 206, such as televisions, monitors, handheld devices, etc. Alternatively, display devices 206 may incorporate functionality of premises equipment 205. For example, the CPE 205 may receive an MPEG2 stream of video, and may process that stream to generate an HDMI (High Definition Multimedia Interface) output signal to each CPE 205 or corresponding display device 206. While STBs are described below, one skilled in the art would appreciate that devices in addition to, or in lieu of STBs, such as personal computers (PCs), servers, gateways, etc., may be used in some embodiments.

Some display devices in the home, however, might not have their own CPE. Or they might not have the circuitry needed to decode the MPEG2 stream of video received at the gateway 202. For example, display devices such as televisions 207a and 207b might be old-fashioned analog televisions, having tuners configured to tune to the analog broadcast channels defined by the NTSC (National Television System Committee). Or they may be digital televisions not equipped to receive and decode the latest form of digital compression or modulation used on the network 100. To support such legacy devices, the gateway 202 may include a local wireless transmitter 208.

The local wireless transmitter 208 may be configured to transmit a low-power radio frequency channel carrying video signals of a selected program for local reception within the home. For example, if the television 207a is an analog television, the gateway 202 may use the transmitter 208 to transmit a selected program as an NTSC video signal on an NTSC Channel (e.g., channel 2). That channel and signal can be tuned by the television 207a, and displayed for the user's consumption. In this manner, legacy devices may continue to be used even if transmission techniques advance. The transmitter 208 may use any desired wireless format, such as IEEE 802.11, ZIGBEE, BLUETOOTH, etc. An 802.11 transmitter 208 may be especially useful, since the 2.4 GHz range of that standard happens to overlap the 300 MHz-3 GHz frequency range of the NTSC UHF channels.

Any number and type of devices (e.g., computers, mobile devices, modems, telephones, set top boxes, etc.) may be located within the network of FIGS. 1 and 2. Those devices located at a user's premises, such as home 102, may generally be referred to as user terminals.

Figure 3:
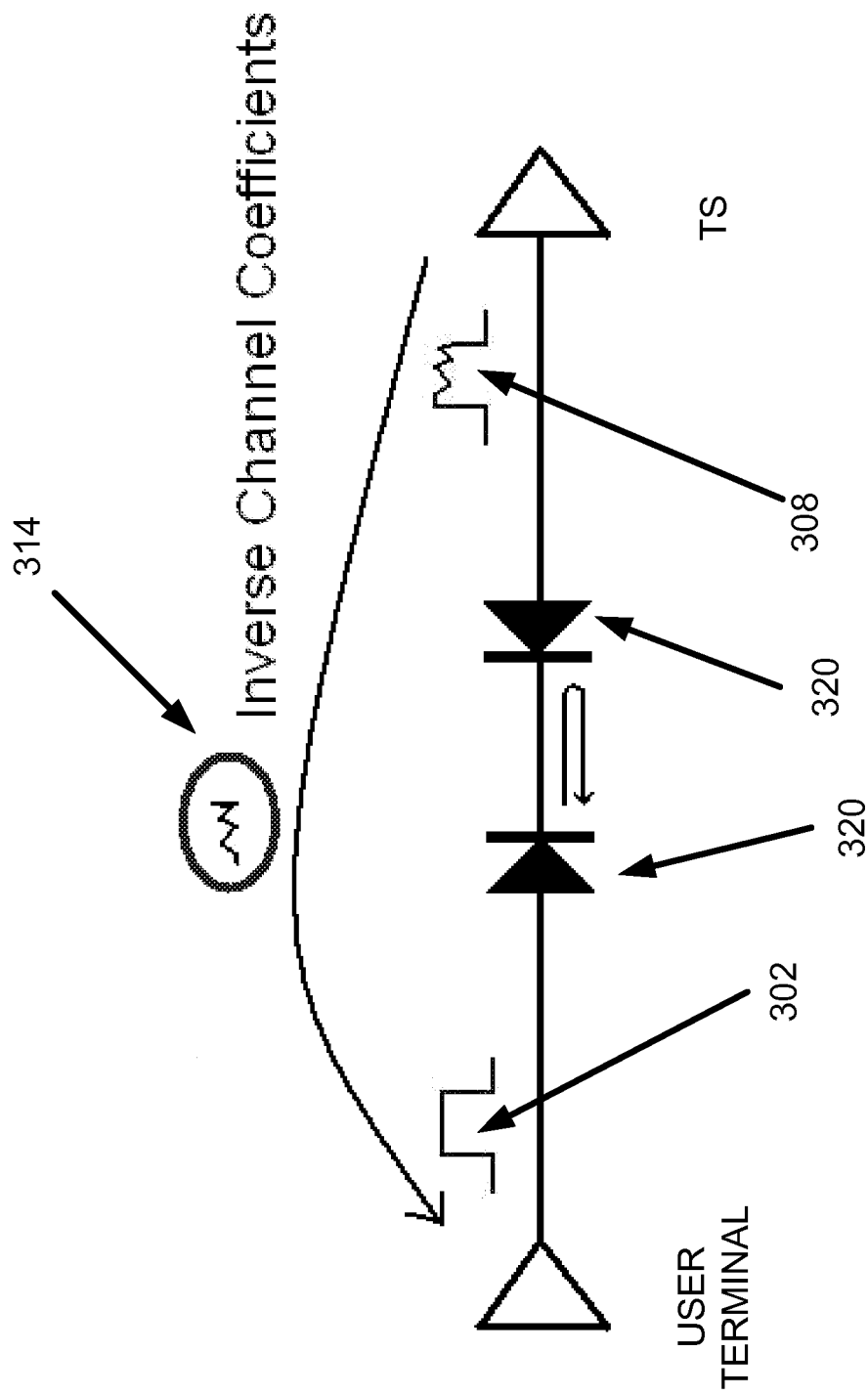
FIG. 3 illustrates a logic diagram for demonstrating how to determine values for equalization coefficients in connection with one or more aspects of this disclosure.

By way of introduction, FIG. 3 illustrates a simplified logic diagram connecting a user terminal, such as a computer or modem, to another device, such as a termination system (TS). In FIG. 3, the user terminal transmits a signal 302 (e.g., a square wave) to the TS. In an ideal operating environment, upon receipt at the TS, signal 308 would be identical to signal 302. However, as shown in FIG. 3, signal 308 includes ripple not present in signal 302 due to distortion. The distortion may be present in the communication channel (e.g., due to an impedance cavity as illustrated via components 320) coupling the user terminal and TS, or the source of the distortion may be present in one or both of the user terminal and the TS. In any event, the TS may provide the user terminal with a set of channel coefficients (illustrated as signal 314 in FIG. 3) that correspond to the inverse of the frequency response associated with the communication from the user terminal to the TS. In this manner, the user terminal may pre-distort future signal transmissions, such that when the signals are received at the TS, the received signals are ideal in terms of amplitude and phase over the operating frequency range.

Given that the frequency response associated with the communication channel or devices may change over time, a new or updated set of coefficients may be communicated to the user terminal periodically (e.g., once every thirty seconds). This periodic update may be scheduled to occur when the user terminal is in an idle state. In some embodiments, the TS may analyze predetermined data fields associated with each, or a subset of every, data transmission from the user terminal for purposes of updating the coefficients.

The equalization coefficients may be useful for correcting linear distortions. Linear distortions may be those distortions that impact the amplitude and/or phase of an original signal and tend to generally be present over time. Micro-reflections (which, as seen by a receiver, may be a copy of a transmitted signal arriving late and with a reduced amplitude), amplitude distortion (which may represent undesirable variation in a communication channel's amplitude response and may result in distortion of a signal's amplitude), and group delay variation (which may represent undesirable variation in a communication channel's phase response and may result in distortion of a signal's phase or a variation in the propagation of frequency components of the signal across the channel) are examples of linear distortions. Non-linear distortions may be those distortions that generate distortion components, including harmonics of the original signal or multiples of the original signal with other energy present in a return band. Examples of non-linear distortions are ingress and noise. Techniques for detecting and handling linear and non-linear distortions are described further below.

As described in the incorporated U.S. Provisional Patent Application No. 61/301,835, a data collection apparatus may be used to retrieve or gather pre-equalization coefficients from one or more devices (e.g., user terminals (such as modems), a server, a termination system (TS) such as a cable modem termination system (CMTS), etc.). The coefficients may be parsed, normalized, and analyzed using Fourier transformation to derive amplitude and phase components. The amplitude and phase components can be derived from a time domain representation, which can be used to synthesize or approximate a symbol placement in connection with a transmission scheme. For example, in the context of conveying symbols using quadrature amplitude modulation, such as 64-QAM, every bit pattern corresponding to the sixty-four (64) possible symbols can be synthesized. Multiple (e.g., a number 'n') iterations can be conducted to achieve a (gaussian) scatter. Such techniques may be applied with respect to a single communication channel (e.g., in relation to communications from a first device, such as a user terminal, and a second device, such as a TS). The techniques may also be applied across a plurality of communication channels or devices (e.g., multiple user terminals in communication with one or more other devices, such as a TS). For example, an in-home service repairman or installer may be interested in the channel characteristics associated with a particular user terminal, whereas a line operator may be more concerned with the performance of all (or a subset of) the user terminals in the communication system.

Figure 4B:
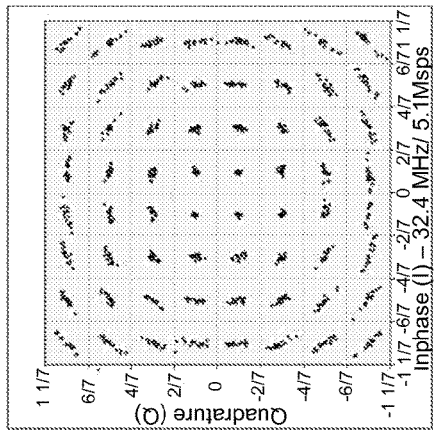
FIGS. 4A-4D illustrate constellation diagrams/patterns in connection with one or more aspects of this disclosure.
Figure 4C:
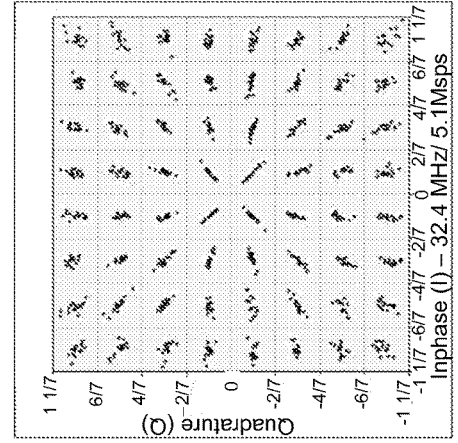
Figure 4A:
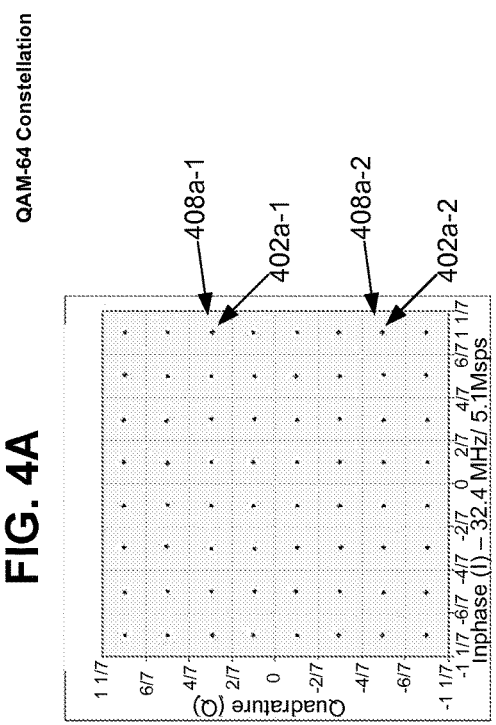

FIGS. 4A-4D (collectively referred to as FIG. 4) illustrate a (64-QAM) constellation pattern that may be used to represent the impact that distortion has in terms of demodulated symbol recognition/detection at a receiver. FIG. 4A represents an ideal symbol placement when no distortion sources are present. As shown in FIG. 4A, the symbols (two of which are labeled as 402a-1 and 402a-2) reside at the center of each of the sixty-four (64) boxes (two of which are labeled 408a-1 and 408a-2).

FIGS. 4B and 4C represent the effect of phase and amplitude distortion, respectively, on the demodulated symbols. Phase distortion is frequently described in terms of group delay distortion, which represents the change in the phase of a signal relative to the frequency components of the signal. When group delay distortion is present, the frequencies transmitted in the system or network are not transmitted in the same amount of time—that is, with equal time delay. For example, in the context of equalizer coefficients implementing a bandpass filter, the delay may be less towards the center of the filter's passband relative to the filter's band edges Amplitude distortion relates to a change of the magnitude of a received signal relative to the magnitude of the transmitted signal. If the magnitude of the received signal is larger than the magnitude of the transmitted signal, then the distortion is said to be constructive in nature. Conversely, if the magnitude of the received signal is less than the magnitude of the transmitted signal, then the distortion is said to be destructive in nature.

Figure 4D:
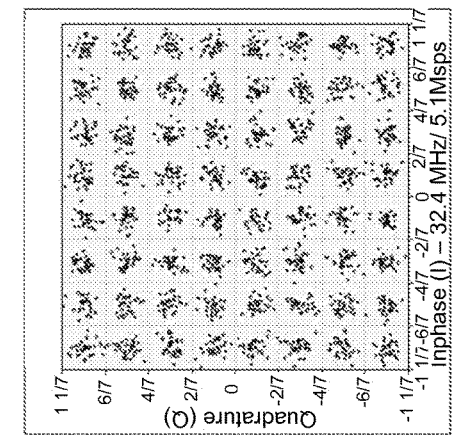

FIG. 4D represents a typical symbol placement in the presence of distortion, taking into consideration both phase and amplitude distortion. Relative to the ideal symbol placement in FIG. 4A, the symbols in FIG. 4D do not reside in the exact centers of each of the sixty-four (64) boxes. Instead, as shown in FIG. 4D, the symbols take on a scattered appearance and may be characterized by a scatter-distribution function. A result of this scatter is a reduction in terms of noise margins associated with the decision boundaries (e.g., the perimeters) of each of the sixty-four (64) boxes, which increases the likelihood of incurring a symbol error at the receiver.

The description provided above in connection with FIGS. 4A-4D relates to the use of a 64-QAM modulation scheme. Other n-QAM schemes (e.g., 16-QAM, 256-QAM, etc.) may be used in some embodiments. In some embodiments, other modulation schemes (e.g., amplitude modulation, frequency modulation, etc.) may be used in addition to, or as an alternative for, n-QAM.

In terms of the constellation patterns shown in FIGS. 4A-4D, a symbol's location may be referenced by its in-phase and quadrature components. FIGS. 5A-5C (collectively referred to as FIG. 5) illustrate one (1) of the sixty-four (64) boxes of FIGS. 4A-4D. As shown in FIG. 5, the in-phase (I) component resides along the vertical axis, and the quadrature (Q) component resides along with horizontal axis. FIG. 5 is illustrative; other coordinate or reference systems may be used in some embodiments.

FIG. 5A illustrates an ideal symbol location indicative of either a lack of distortion or the presence of distortion sources that cancel one another out. In the presence of amplitude distortion, the symbol would tend to move closer to the 'Q' axis (relative to the ideal symbol placement) as shown in FIG. 5B. In the presence of phase distortion, the symbol would tend to move closer to the 'I' axis (relative to the ideal symbol placement) as shown in FIG. 5C.

FIGS. 4 and 5 are representations of the symbol locations as provided in a constellation pattern for purposes of visualizing the symbol-space. A calculation of a modulation error ratio (MER) may be conducted in conjunction with the constellation patterns of FIGS. 4 and 5 to characterize symbol placement. Modulation error ratio may represent the ratio of average symbol power to average error power. An equation for calculating MER is as follows:

$$MER(\text{dB}) = -10 * \log 10 \left\{ \frac{\sum_{i=1}^{n} (\delta I_i^2 + \delta Q_i^2)}{\sum_{i=1}^{n} (I_i^2 + Q_i^2)} \right\}$$

where $$\delta Q = \sqrt{\sum_{i=1}^{n} \frac{(A_i \sin\alpha_i + \Phi_i \cos\alpha_i)^2}{n}}$$

$$\delta I = \sqrt{\sum_{i=1}^{n} \frac{(\Phi_i \sin\alpha_i - A_i \cos\alpha_i)^2}{n}}$$

In terms of the MER equation shown above, the in-phase (I) and quadrature (Q) components of the ideal symbol placements are known based on the modulation scheme used. A Fourier transform computation provides the inverse distortion of the amplitude (A) and phase ($\Phi$) respective of frequency. A root-mean-square (RMS) calculation of the amplitude and phase distortion provides the in-phase delta ($\delta I$) and quadrature delta ($\delta Q$) values for each symbol (n), where $\alpha$ represents the amplitude/phase vector angle (radius). Using the MER equation, a quantified value may be obtained that may be used, for example, to determine how to prioritize resolving (potential) problems or issues. For example, a network operator or provider may allocate resources (e.g., personnel and tool sets) to those portions of a network having the lowest MER (and thus, the highest average error power relative to the average symbol power).

The difference between the ideal symbol location at the center of a given box and the actual location of the symbol is referred to as an error vector. The distance from the center of the box may be referred to as the error vector magnitude (EVM). The EVM may be calculated as follows:

$$EVM = 100\% * \sqrt{\frac{\frac{1}{n}\sum_{i=1}^{n}(\delta I_i^2 + \delta Q_i^2)}{SE^2}}$$

Figure 6:
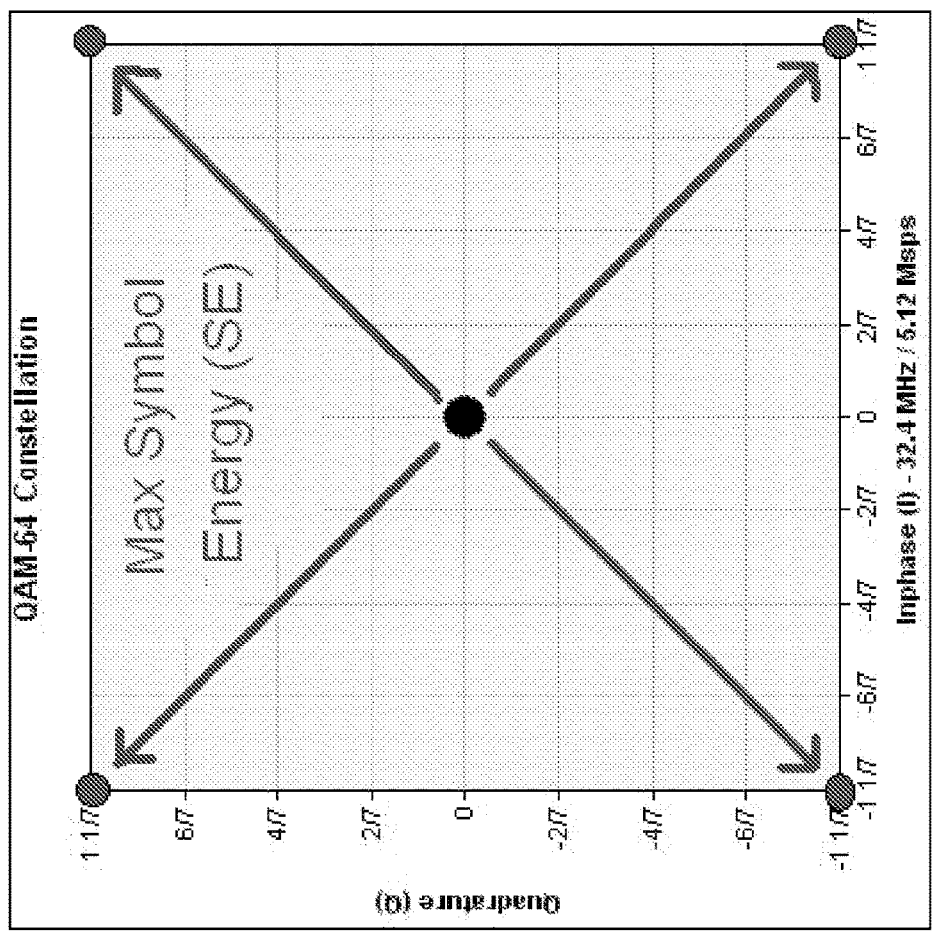
FIG. 6 illustrates a representation of maximum symbol energy in connection with one or more aspects of this disclosure.

The terminology used in the EVM equation is the same as the terminology discussed above with respect to the calculation of MER. 'SE' represents the maximum symbol energy and is calculated from the outer corners of an I-Q constellation as shown in FIG. 6. $SE^2 = I_{max}^2 + Q_{max}^2$, where $I_{max}$ is the real component of the outermost constellation symbol in the constellation diagram, $Q_{max}$ is the imaginary component of the outermost constellation symbol in the constellation diagram, and the outermost constellation symbol is the symbol with the highest power.

The above-described techniques are effective in determining the impact of linear distortion on symbol placement. Stated in a slightly different way, the above techniques may be used to quantify the impact that linear distortion sources have on symbol placement. Linear distortions may be transformative in nature and may create standing-wave types of impairments. The linear distortions may be accounted for by pre-distorting transmissions from the user terminal in accordance with the inverse channel response associated with the communication system. For example, equalization coefficients may be used to pre-distort a signal transmission from a user terminal to a TS on an upstream communication channel.

As described above, non-linear distortion sources (e.g., ingress and noise) may also be present in a communication network. Whereas the linear distortions may tend to be transformative in nature, non-linear distortion sources may tend to be additive in nature. Use of a pre-distorting mechanism (such as equalization coefficients) may help to mitigate the effects of the non-linear distortion in terms of symbol demodulation/recognition at a receiver. However, the use of a pre-distorting mechanism may also tend to increase or amplify the effects of the non-linear distortion in terms of symbol demodulation/recognition at a receiver.

Given that non-linear distortion sources may be spurious or intermittent in nature, a technique may be used to determine the likely presence of a non-linear distortion. For example, as described in the incorporated U.S. Provisional Patent Application No. 61/301,835, standing wave and steady-state interference that may be indicative of a linear distortion may typically be equalized within a relatively short period of time (e.g., 30 seconds). Non-linear distortions, such as noise, common path distortion (CPD) and impulse may demonstrate a frequency response signature that never completely equalizes. Equalization coefficients may be collected, subjected to a Fourier transformation, and analyzed in the aggregate for signal impairments. Amplitude, group and phase delay may be measured for Voltage Standing Wave Ratio (VSWR) or any other type of parameter to quantify a wave magnitude or ratio. If subsequent equalization (by way of coefficient replacement or coefficient combination techniques, such as averaging or convolution) fails to reduce the wave ratio, this may indicate the presence of non-linear distortion sources.

The likely existence of a non-linear distortion source may be determined based on whether equalization eliminates or reduces a wave ratio value within a predetermined amount of time (e.g., within a relatively short amount of time). Furthermore, techniques described herein can also be used to provide an approximate location of the non-linear distortion source. Stated in a slightly different way, each user terminal's contribution to the distortion can be analyzed and determined.

Figure 7A:
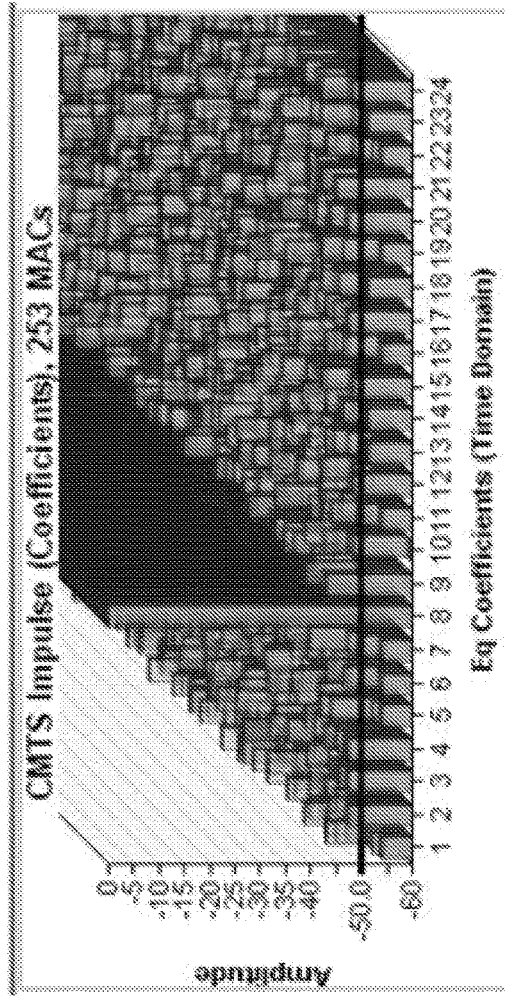
FIGS. 7A-7B illustrate examples of equalization coefficients and amplitude distortion in connection with one or more aspects of this disclosure.
Figure 7B:
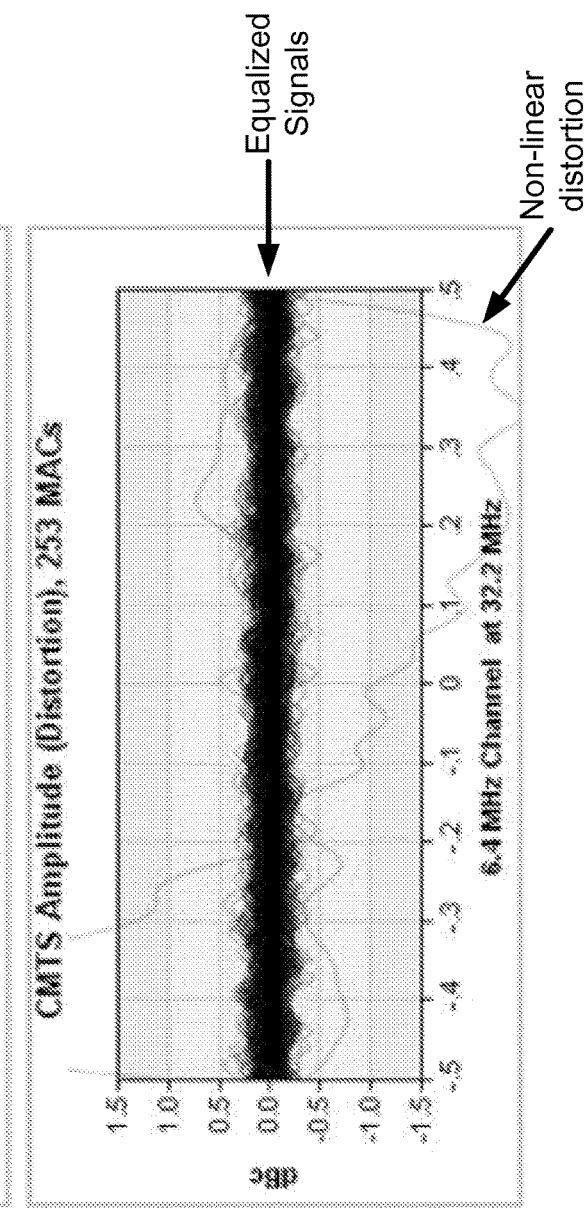

FIG. 7A illustrates an example of sets of equalization coefficients for a plurality of user terminals (e.g., modems) as obtained from a TS. In particular, FIG. 7A shows twenty-four (24) taps along the horizontal axis, and amplitudes corresponding to each of the taps on the vertical axis. As shown, the majority of the energy of the signals is located in the reference or main-tap position #8. FIG. 7B represents the signals received from the user terminals in terms of amplitude (along the vertical axis) relative to frequency (along the horizontal axis). A majority of the received signals reside within +0.5 band of 0.0 dBc as shown (as indicated by the heavier, darker bands near 0.0 dBc), and is likely indicative of effective equalization of any linear distortion source(s) that may have been present. Some of the received signals demonstrate large magnitudes and changes in terms of amplitude, which may be indicative of a non-linear distortion, as shown. While not shown in FIG. 7, a plot of the phase (similar to that shown in FIG. 7B for amplitude) could also be generated and analyzed.

Figure 8:
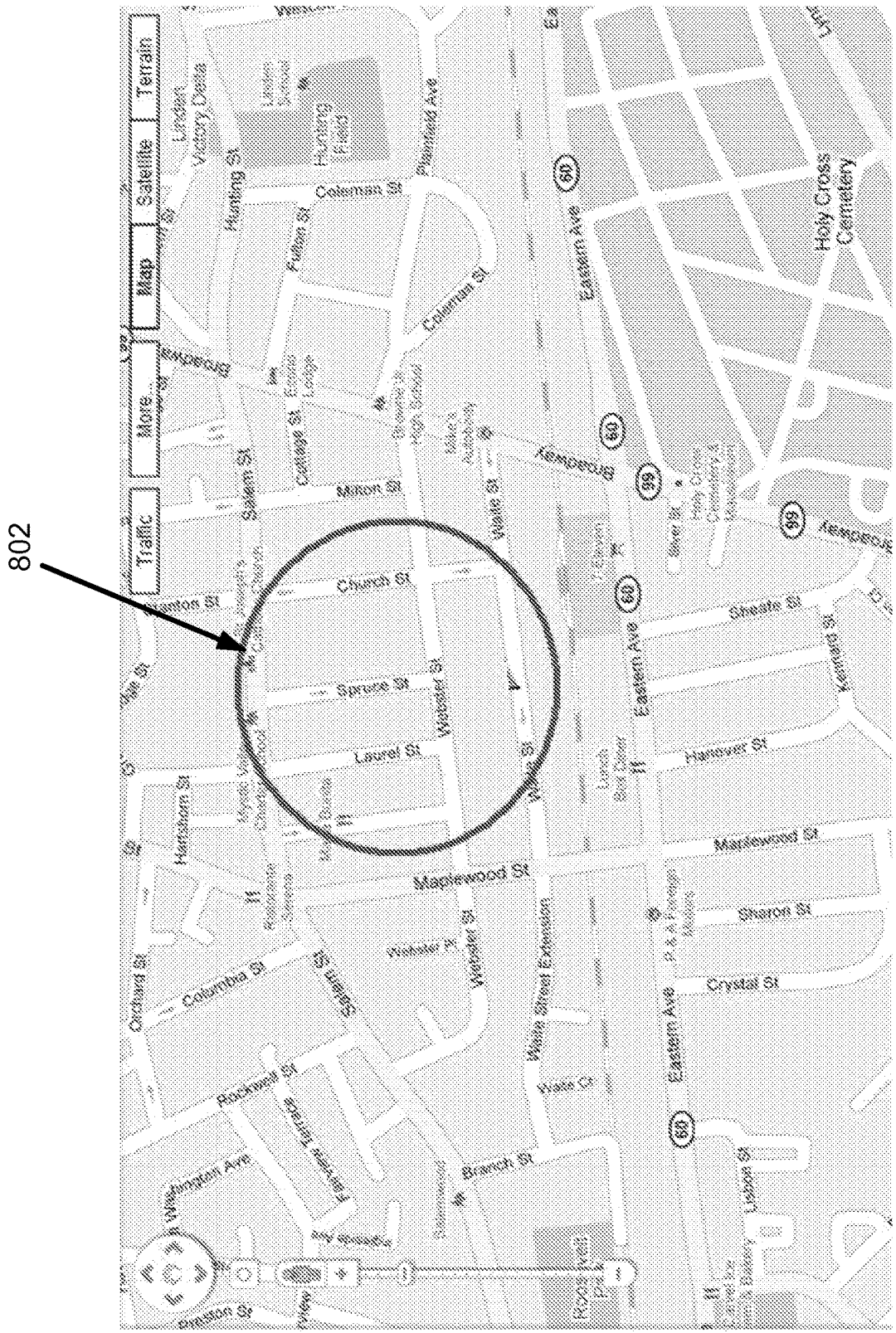
FIG. 8 illustrates a map in connection with one or more aspects of this disclosure.

An analysis may be conducted to identify the user terminals that appear to be subject to non-linear distortion. For example, a device (such as a TS) may maintain a table of responses with an entry for each user terminal, where each user terminal or device may be identified by an identifier, such as a MAC address. Once the user terminals have been identified, relationships between the terminals can be formulated or postulated in an effort to pinpoint the source of the non-linear distortion. For example, FIG. 8 illustrates a scenario where the identified user terminals are correlated to their geographic location (e.g., by way of user account information). In the scenario depicted in FIG. 8, all of the user terminals that are subject to non-linear distortion are located within circle 802. Armed with the knowledge of the geographic location(s) impacted by the non-linear distortion, a layout specific to the impacted terminals may be analyzed (e.g., compared) to determine the likely source(s) of the non-linear distortion. In the scenario associated with FIG. 8, all of the user terminals located within circle 802 may be connected to a TS by way of an amplifier 904 near the corner of Church Street and Webster Street as shown in FIG. 9.

Figure 9:
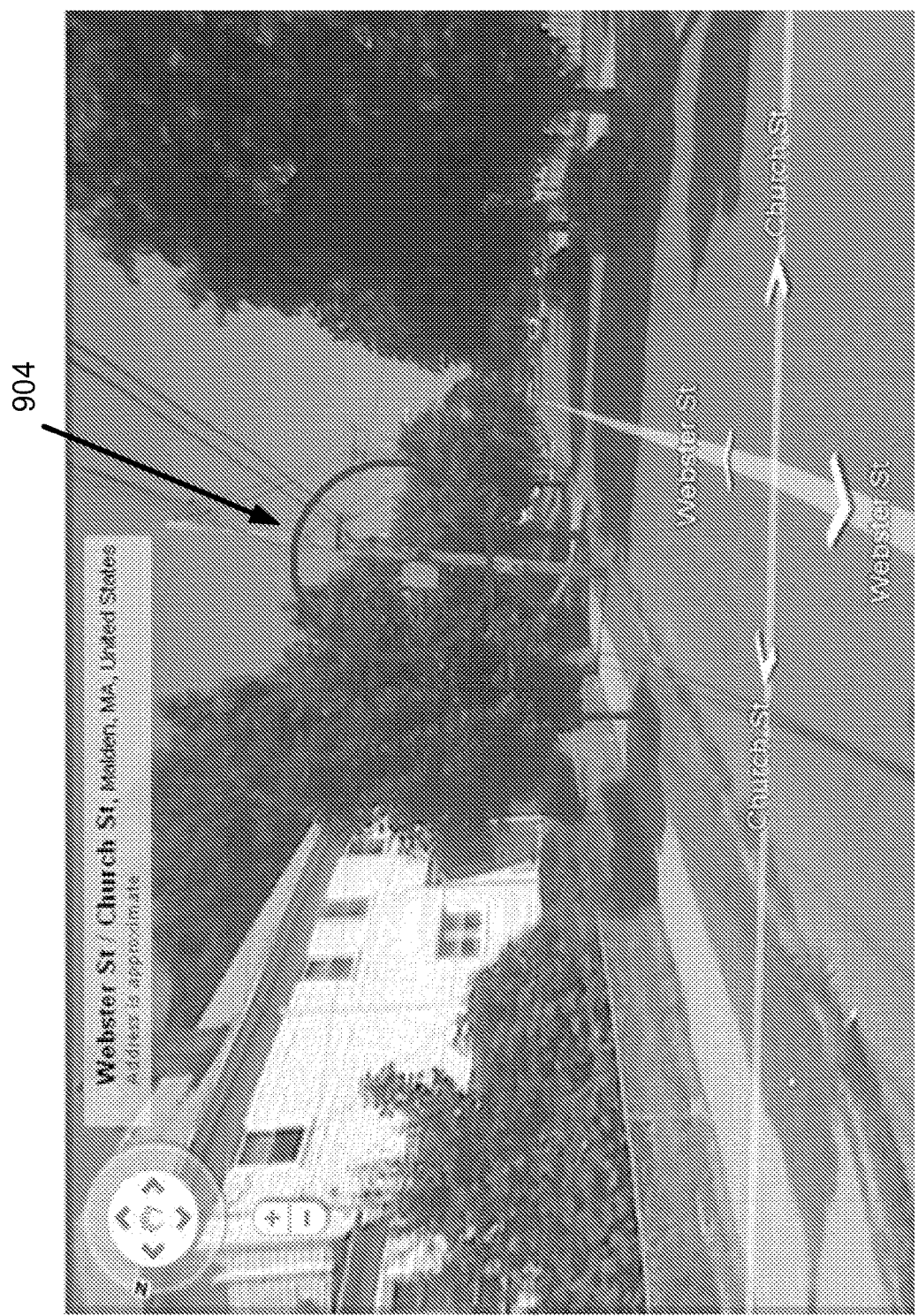
FIG. 9 illustrates a device suitable for demonstrating one or more aspects of this disclosure.

The scenarios depicted in FIGS. 7-9 are illustrative. Distortion sources (particularly non-linear distortion sources such as ingress and noise) may cause signal impairments that may manifest themselves in any number of ways, in networks of various topologies or layouts. The techniques described herein may provide a starting point or baseline for diagnosing an issue or problem by prioritizing where to look first. Based on the foregoing description, a line operator or technician may be able to determine or pin-point the likely location of a non-linear distortion source without having to have knowledge of the internal configuration of the user terminals or the TS. Problems or issues that previously would have remained unresolved, or taken teams of personnel weeks or even months to fix, may be reduced to a simple task conducted by a single person taking on the order of half an hour.

Figure 10:
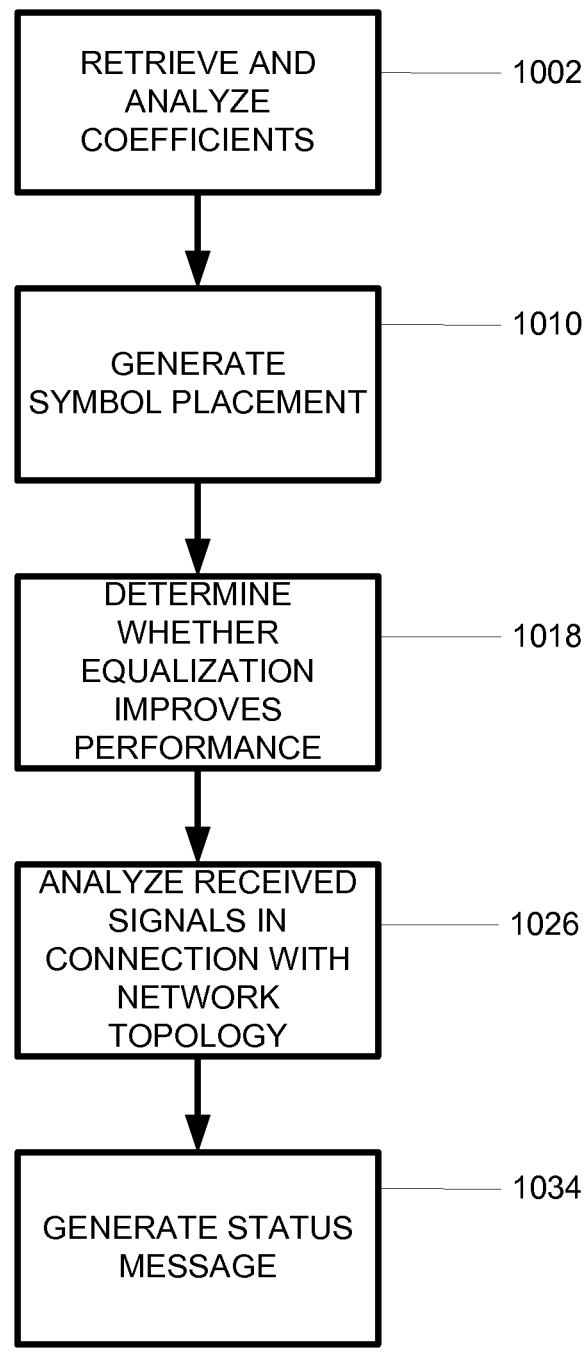
FIG. 10 illustrates a method suitable for demonstrating one or more aspects of this disclosure.
Figure 1:
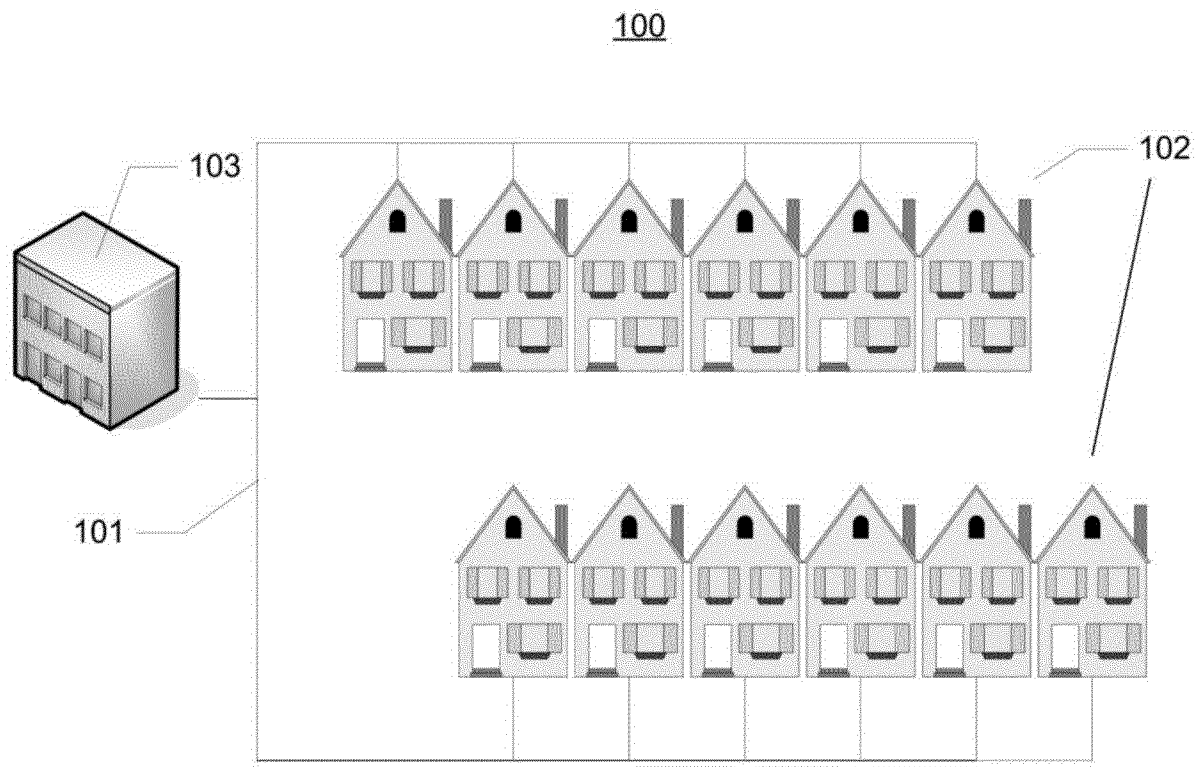

FIG. 10 illustrates a method that may be used to practice one or more aspects of this disclosure. In step 1002, equalization coefficients may be retrieved and analyzed to determine a communication channel's amplitude and/or phase response over an operating frequency range. The equalization coefficients may be obtained from a user terminal, from a TS, from a storage device (e.g., a database), or any other device that may be used to store the equalization coefficients.

In step 1010, a symbol placement may be generated or synthesized based on the coefficients retrieved and analyzed in step 1002. In this manner, service personnel, a line operator, analyses software, or the like may obtain insight into the underlying performance of the modulation/demodulation from a pre-equalization perspective. Moreover, such a symbol generation lends itself to testing all possible combinations of symbols without having to actually exercise the associated hardware/software/firmware (e.g., without having to actually transmit or receive those symbols). Constellation diagrams similar to the ones shown in FIGS. 4B-4D may be generated and/or displayed on a display device in conjunction with step 1010.

While not shown in FIG. 10, multiple iterations of coefficient retrieval/analysis (step 1002) and symbol generation (step 1010) may be conducted over time to obtain a scatter of transmission performance over time. Such multiple iterations may be conducted using a time-based loop in a program executing on one or more computers or computing platforms.

In step 1018, a determination may be made whether the equalization is effective in reducing distortion (in terms of amplitude and/or phase) over a (predetermined period of) time. For example, equalization may have a tendency to average-out signal distortions caused by a linear distortion source. If the equalization is ineffective in eliminating or reducing the distortion below a threshold level within a threshold amount of time, a determination may be made that it is likely or probable that a non-linear distortion source is present.

In step 1026, signals received from a plurality of user terminals may be analyzed (e.g., compared) in an effort to establish a relationship between those user terminals that may be experiencing signal impairment above a threshold level. For example, as described above with respect to FIGS. 7-9, a geographic location of user terminals experiencing signal impairment above a threshold level may be determined, and a network topology may be studied or compared to determine what those user terminals have in common relative to those user terminals that are not experiencing the signal impairment. In this manner, probable or likely source(s) of the non-linear distortion may be identified.

In step 1034, one or more status messages may be generated. The status message may indicate those symbols that are most likely to be subject to demodulation error at a receiver. For example, the equalization coefficients may be analyzed to determine which pre-equalization symbols are closest to or within a threshold distance of the decision boundaries associated with the transmission scheme used. In this manner, a (sub)set of candidate input symbols may be generated to facilitate testing or troubleshooting in the event of a reported error or failure.

The status message(s) of step 1034 may also provide a distance from a user terminal (or TS) to a likely source of a problem. For example, a map similar to the one shown in FIG. 8 may be generated. In this manner, network management may be in a better position to determine the extent of a potential problem and the personnel and tools that may need to be allocated to address the potential problem. If the topology of the network or communication system is known in sufficient detail, the distance may be correlated to device(s) located at that distance. For example, in reference to FIG. 9, the status message may provide details regarding amplifier 904, such as amplifier 904's make and model number, its version/revision number, and any other information that may be useful in analyzing or troubleshooting the amplifier 904.

The status message(s) generated in step 1034 may include additional information that may be used to facilitate debugging or troubleshooting. For example, the TS may maintain a library or database of past issues or problems (with possible input from service personnel or the like) and the causes of those past problems. In this manner, the library or database may be consulted to identify not only the likely location of the problem or error, but the likely cause of the problem or error, thereby correlating a current issue with past issues and techniques used to resolve those past issues. Having such knowledge in advance of going to the site of the problem may enable service personnel to pack appropriate tool sets and may facilitate the selection of service personnel (e.g., if correcting the problem entails a specific skill set, one service technician could be selected over another).

The status message(s) generated in step 1034 may be conveyed in one or more formats. For example, the status message may include an audio message (e.g., a broadcast over radio), an email, a text message, an image/video message, or the like. If a potential problem is located in the user's premises (e.g., the user's home), the status message may be conveyed to the user and may either request the user to schedule an appointment with service personnel, or if the problem is simple enough to correct (e.g., a loose connector), may provide the user with guidance (e.g., an instructional video) on how to fix the problem (e.g., how to alter a user terminal or a component associated with the user terminal).

While the above description was largely presented in the context of user terminals in communication with a TS, aspects of this disclosure may readily be applied to other contexts as well. For example, the qualities of peer to peer communication systems, (mobile) telephone communication systems, satellite communication systems, and the like may also be monitored and evaluated using the techniques described herein. Of course, the contexts described herein are merely illustrative. Additional contexts are well within the scope and spirit of this disclosure.

Although not required, various aspects described herein may be embodied as a method, a data processing system, or as a computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. In addition, various signals representing data or events as described herein may be transferred between a source and a destination in the form of electromagnetic waves traveling through signal-conducting media such as metal wires, optical fibers, and/or wireless transmission media (e.g., air and/or space). In some embodiments, one or more transitory and/or non-transitory media may include instructions that, when executed by one or more computers or apparatuses, cause the one or more computers or apparatuses to perform the methodological acts and processes described herein.

As described herein, the various methods and acts may be operative across one or more computing servers and one or more networks. The functionality may be distributed in any manner, or may be located in a single computing device (e.g., a server, a client computer/user terminal, etc.). As discussed herein, timing and frequency information related to communications between two or more devices may be obtained across various data, television, telephone, and computer networks, and both proactive and reactive support in the presence of potential problems or actual errors is provided for. Moreover, upstream spectrum analysis capabilities are provided to operations and support personnel who would not normally have access to analyzer hardware. Visibility into upstream channels may be obtained without added expense. The analysis into the upstream channel performance may be conducted on a non-invasive basis, thereby eliminating or mitigating impact on user service. For example, service personnel (or other persons) may obtain insight into the relative health and performance of the modulation/demodulation without having to turn off an equalizer or equalizer functionality at a user terminal. The techniques described may be used to determine the likely existence of a non-linear distortion source and its location. Moreover, the techniques described herein may require fewer resources (e.g., service personnel, tool sets, etc.) relative to the techniques that were previously used.

As described herein, the methodological acts and processes may be tied to particular machines or apparatuses. For example, as described herein, a user terminal, such as a STB, computer, or modem, may equalize a signal prior to transmitting the signal to a receiving device (e.g., a TS). The coefficients used to perform that equalization may be (repeatedly) retrieved and analyzed from one or both of the user terminal and the receiving device. More generally, one or more computers may include one or more processors and memory storing instructions, that when executed, perform the methodological acts and processes described herein. Furthermore, the methodological acts and processes described herein may perform a variety of functions including transforming an article (e.g., equalization coefficients in conjunction with a received signal) into a different state or thing (e.g., a likelihood of a symbol error or a measurement of how hard an equalization function is working at a user terminal to eliminate distortion, a synthesis of symbol placement in relation to a modulation/demodulation scheme used, a likely or approximate location of a potential problem or error, etc.).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

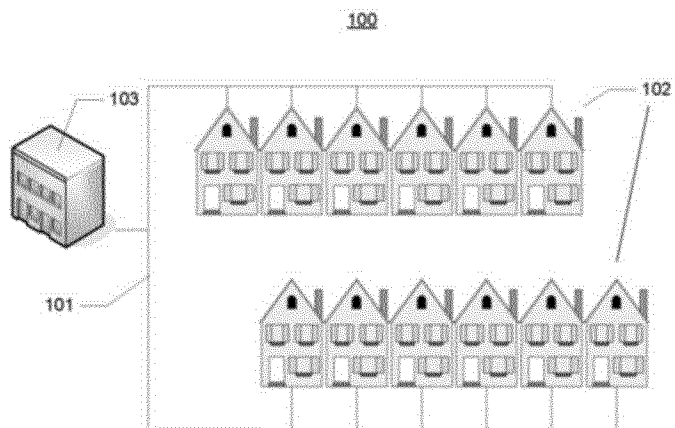

What is claimed is:

1. An apparatus comprising:
one or more processors; and
memory storing instructions that, when executed by the one or more processors, cause the apparatus to:
generate, based on a first signal received from a computing device, a first symbol placement, wherein the first signal was transmitted based on a first set of equalization coefficients;
transmit, to the computing device, a second set of equalization coefficients;
generate, based on a second signal received from the computing device, a second symbol placement, wherein the second signal was transmitted based on the second set of equalization coefficients; and
transmit, based at least in part on the second symbol placement, a status message comprising an indication of one or more symbols that satisfy a threshold indicative of likely demodulation error at the computing device.

2. The apparatus of claim 1, wherein the instructions, when executed by the one or more processors, further cause the apparatus to:
determine whether a signal impairment associated with the second signal satisfies a threshold value; and
after determining that the signal impairment associated with the second signal does not satisfy the threshold value, determine that the signal impairment associated with the second signal is non-linear.

3. The apparatus of claim 2, wherein the instructions, when executed by the one or more processors, further cause the apparatus to:
determine that a signal impairment associated with a third signal received from a different computing device is non-linear;
determine a network component of a communication channel common to the computing device and the different computing device; and
determine that the network component is a probable error source location of the signal impairment associated with the second signal and the signal impairment associated with the third signal, wherein the status message comprises an identifier of the network component.

4. The apparatus of claim 1, wherein the instructions, when executed by the one or more processors, further cause the apparatus to:
calculate, based on the first symbol placement, at least one of a modulation error ratio (MER) or an error vector.

5. The apparatus of claim 1, wherein the instructions, when executed by the one or more processors, further cause the apparatus to:

determine a location of a source likely causing a non-linear signal impairment, wherein the status message comprises an indication of a distance between the source and the computing device.

6. The apparatus of claim 1, wherein the instructions, when executed by the one or more processors, further cause the apparatus to:
calculate a distance between a location of an ideal symbol placement and an actual location of the second symbol placement.

7. The apparatus of claim 1, wherein the instructions, when executed by the one or more processors, further cause the apparatus to:
generate, based on the first symbol placement and the second symbol placement, a constellation pattern comprising a plurality of demodulation decision boundaries for different symbols, and wherein the threshold indicative of likely demodulation error comprise a threshold distance to a demodulation decision boundary of the plurality of demodulation decision boundaries.

8. The apparatus of claim 1, wherein the first set of equalization coefficients comprises a set of pre-equalization coefficients.

9. An apparatus comprising:
one or more processors; and
memory storing instructions that, when executed by the one or more processors, cause the apparatus to:
determine that application of equalization coefficients to signals transmitted by a computing device and via a communication channel is unable to reduce signal impairment associated with the signals to satisfy a threshold value within a threshold amount of time;
determine, based on the determination that application of equalization coefficients is unable to reduce the signal impairment to satisfy the threshold value within the threshold amount of time, that a non-linear signal impairment is present in the communication channel; and
causing output of an indication that the non-linear signal impairment is present in the communication channel.

10. The apparatus of claim 9, wherein the instructions, when executed by the one or more processors, cause the apparatus to:
determine that a signal received from a different computing device has the non-linear signal impairment; and
determine, based on a communication path common to the computing device and the different computing device, a probable location of a source of the non-linear signal impairment.

11. The apparatus of claim 10, wherein the instructions, when executed by the one or more processors, cause the apparatus to:
transmit at least one status message comprising a map indicating a geographic region where the computing device and the different computing device are located.

12. The apparatus of claim 11, wherein the at least one status message comprises an indication of a distance between the probable location of the source and the computing device.

13. An apparatus comprising:
one or more processors; and
memory storing instructions that, when executed by the one or more processors, cause the apparatus to:
generate, based on a first set of equalization coefficients associated with a first signal received from a computing device, a first symbol placement;

generate, based on a second set of equalization coefficients associated with a second signal received from the computing device, a second symbol placement; and
determine a likely source of a demodulation error associated with the first symbol placement and the second symbol placement.

14. The apparatus of claim 13, wherein the instructions, when executed by the one or more processors, cause the apparatus to:
transmit a status message comprising an indication of which of a plurality of symbols is more likely to be subject to a demodulation error at the computing device.

15. The apparatus of claim 13, wherein the instructions, when executed by the one or more processors, cause the apparatus to:
determine whether a signal impairment associated with the second signal satisfies a threshold value; and
after determining that the signal impairment associated with the second signal does not satisfy the threshold value, determine that the signal impairment associated with the second signal is non-linear.

16. The apparatus of claim 13, wherein the instructions, when executed by the one or more processors, cause the apparatus to:
transmit, to a device and based on the second symbol placement, guidance on how to alter the computing device or a component associated with the computing device.

17. The apparatus of claim 13, wherein the instructions, when executed by the one or more processors, cause the apparatus to:
transmit, based on the second symbol placement, a distance between the computing device and the likely source of the demodulation error.

18. The apparatus of claim 13, wherein the instructions, when executed by the one or more processors, cause the apparatus to:
generate a constellation pattern based on the first symbol placement and the second symbol placement.

19. The apparatus of claim 13, wherein the instructions, when executed by the one or more processors, cause the apparatus to:
calculate one or more of a modulation error ratio (MER) corresponding to the second symbol placement or an error vector corresponding to the second symbol placement.

20. The apparatus of claim 13, wherein the first set of equalization coefficients comprises a set of pre-equalization coefficients.

21. A system comprising:
a first computing device and a second computing device;
wherein the first computing device comprises:
one or more processors; and
memory storing instructions that, when executed by the one or more processors, cause the first computing device to:
generate, based on a first signal received from the second computing device, a first symbol placement, wherein the first signal was transmitted based on a first set of equalization coefficients;
transmit, to the second computing device, a second set of equalization coefficients;
generate, based on a second signal received from the second computing device, a second symbol placement, wherein the second signal was transmitted based on the second set of equalization coefficients; and transmit, based at least in part on the second symbol placement, a status message comprising an indication of one or more symbols that satisfy a threshold indicative of likely demodulation error at the second computing device; and wherein the second computing device comprises:
one or more processors; and
memory storing instructions that, when executed by the one or more processors of the second computing device, cause the second computing device to:
transmit the first signal; and
transmit the second signal.

22. The system of claim 21, wherein the first computing device comprises a cable modem termination system, and wherein the second computing device comprises a user device.

23. The system of claim 21, wherein the instructions of the first computing device, when executed by the one or more processors of the first computing device, further cause the first computing device to:
determine whether a signal impairment associated with the second signal satisfies a threshold value; and
after determining that the signal impairment associated with the second signal does not satisfy the threshold value, determine that the signal impairment associated with the second signal is non-linear.

24. The system of claim 21, wherein the instructions of the first computing device, when executed by the one or more processors of the first computing device, further cause the first computing device to:
determine a location of a source likely causing a non-linear signal impairment, wherein the status message comprises an indication of a distance between the source and the second computing device.

* * * * *

UNITED STATES PATENT AND TRADEMARK OFFICE
CERTIFICATE OF CORRECTION

PATENT NO. : 10,187,397 B2
APPLICATION NO. : 15/426173
DATED : January 22, 2019
INVENTOR(S) : Wolcott et al.

Page 1 of 3

It is certified that error appears in the above-identified patent and that said Letters Patent is hereby corrected as shown below:

On the Title Page

Delete the title page and substitute therefore with the attached title page consisting of the corrected illustrative figure Column 2, Other Publications, Line 1:
Please delete "5,434,193," and insert --6,434,193,--

In the Drawings

Please replace FIG. 1 with FIG. 1 as shown on the attached pages

In the Specification

Column 5, Detailed Description, Line 39:
Delete "(gaussian)" and insert --(Gaussian)--

Column 6, Detailed Description, Line 5:
After "edges", insert --.--

Signed and Sealed this
Eleventh Day of February, 2020

Andrei Iancu
*Director of the United States Patent and Trademark Office*

CERTIFICATE OF CORRECTION (continued)

(12) United States Patent
Wolcott et al.

(10) Patent No.: US 10,187,397 B2
(45) Date of Patent: *Jan. 22, 2019

(54) MODULATION ANALYSIS AND DISTORTION IDENTIFICATION

(71) Applicant: Comcast Cable Communications, LLC, Philadelphia, PA (US)

(72) Inventors: Lawrence D. Wolcott, Denver, CO (US); Phillip F. Chang, Langhorne, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,173

(22) Filed: Feb. 7, 2017

(65) Prior Publication Data
US 2018/0198798 A1    Jul. 12, 2018

Related U.S. Application Data

(63) Continuation of application No. 14/187,912, filed on Feb. 24, 2014, now Pat. No. 9,602,518, which is a (Continued)

(51) Int. Cl.
*H04L 29/06* (2006.01)
*H04L 25/03* (2006.01)
(Continued)

(52) U.S. Cl.
CPC ............ *H04L 63/107* (2013.01); *H04L 25/03* (2013.01); *H04L 25/03019* (2013.01);
(Continued)

(58) Field of Classification Search
CPC ... H04L 2025/0342; H04L 2025/03808; H04L 1/206; H04L 25/03019; H04B 2201/709709
See application file for complete search history.

(56) References Cited

U.S. PATENT DOCUMENTS 5,311,546 A    5/1994  Paik et al.
5,881,108 A    3/1999  Herzberg et al.
(Continued)

FOREIGN PATENT DOCUMENTS

JP         04208707 B2    1/2009

OTHER PUBLICATIONS

US 5,434,193, 08/2002, Fukuoka (withdrawn)
(Continued)

*Primary Examiner* — Khanh C Tran
(74) *Attorney, Agent, or Firm* — Banner & Witcoff, Ltd.

(57) ABSTRACT

An apparatus, method, computer readable medium, and system are provided to determine whether a non-linear signal impairment is present in a network communication channel. For instance, a computing device may transmit equalization coefficients to a user device to modify future signals generated by the user device. If the equalization coefficients are unable to reduce a signal impairment, the signal impairment may be a non-linear signal impairment. The computing device may generate symbol placements based on signals received from the user device and transmit status messages.

24 Claims, 10 Drawing Sheets